United States Patent [19]

Bilow et al.

[11] 4,180,649

[45] Dec. 25, 1979

[54] HOMOPOLYMERIZABLE ACETYLENE-TERMINATED TETRAIMINES AND PROCESS FOR MAKING SAME

[75] Inventors: Norman Bilow, Encino; William B. Austin, Gardena, both of Calif.

[73] Assignee: Hughes Aircraft Company, Culver City, Calif.

[21] Appl. No.: 962,575

[22] Filed: Nov. 20, 1978

[51] Int. Cl.$^2$ .............................................. C08 12/08
[52] U.S. Cl. ................................ 528/245; 528/244; 528/265; 528/266; 528/269
[58] Field of Search ............... 528/244, 245, 265, 266, 528/269

[56] References Cited

U.S. PATENT DOCUMENTS

| | | | |
|---|---|---|---|
| 3,845,018 | 10/1974 | Bilow et al. | 528/392 |
| 3,864,309 | 2/1975 | Bilow et al. | 528/183 |
| 3,879,349 | 4/1975 | Bilow et al. | 528/127 |
| 3,897,395 | 7/1975 | D'Alelio | 526/263 |
| 3,928,450 | 12/1975 | Bilow et al. | 260/571 |
| 4,075,111 | 2/1978 | Bilow | 252/12 |
| 4,098,767 | 7/1978 | Bilow | 526/263 |
| 4,108,836 | 8/1978 | Bilow | 528/128 |

*Primary Examiner*—Lucille M. Phynes
*Attorney, Agent, or Firm*—Booker T. Hogan, Jr.; W. H. MacAllister

[57] ABSTRACT

Acetylene-substituted tetraimines are synthesized to form oligomers or prepolymers having melting points as low as 40° C. and which can be polymerized into thermoset plastics at temperatures as low as 150° C.

15 Claims, No Drawings

HOMOPOLYMERIZABLE ACETYLENE-TERMINATED TETRAIMINES AND PROCESS FOR MAKING SAME

RELATED APPLICATIONS

In U.S. application Ser. No. 962,573 filed on Nov. 20, 1978 Applicant, Norman Bilow, a new class of acetylene terminated Schiff's bases which polymerize into conjugated polymers is disclosed. The oligomers of Application Ser. No. 962,573 differ structurally from the oligomers hereinafter disclosed and exhibit physical and chemical properties considerably different from those exhibited by the oligomers of the present invention.

The invention herein disclosed and the invention of U.S. application Ser. No. 962,573 are both assigned to Hughes Aircraft Company of Los Angeles, California.

BACKGROUND AMD PRIOR ART

1. Field of the Invention

This application relates to a novel class of oligomers having acetylene terminal groups in general and more particularly to the preparation of polymerizable acetylene-substituted tetraimines.

2. Prior Art

The need for prepolymers and oligomers which polymerize into thermally stable, mechanically strong thermoset resins with the production of little or no voids has been thoroughly established. Such materials are useful as adhesives, molding compounds, insulating materials and as matricies in the formation of composites.

During the past ten years considerable resources have been expended in the field of acetylene chemistry in an attempt to provide thermally stable materials which polymerize into useful resins having little or no voids. The closest known prior art, disclosing this work is found in the following series of U.S. Patents issued to Co-applicant, Norman Bilow, herein and others. The relevant U.S. Patents are: U.S. Pat. Nos. 3,845,018, entitled "Acetylene Substituted Polyimide Oligomers," dated Oct. 29, 1974; 3,864,309, entitled "Copolymer of Polyimide Oligomers and Terephthalonitrile N,N-Dioxide and Their Method of Preparation," dated Feb. 4, 1975; 3,879,349, entitled "Homopolymerization of Acetylene Substituted Polyimide Polymers," dated Apr. 22, 1975; 3,928,450, entitled "Acetylene Substituted Aromatic Primary Amines and the Process of Making Them," dated Dec. 23, 1975; 4,075,111, entitled "Heavy Metal Chalcogenide-Polyimide Lubricative Composites," issued Feb. 21, 1978; 4,098,767, entitled "Copolymers of Ethynyl Terminated Polyimides and Diethynylbenzene," issued July 4, 1978; and 4,108,836, entitled "Process for Synthesizing Acetylene Substituted Polyimides and Polyimides Thereof," issued Aug. 22, 1978.

Each of the patents listed above and incorporated herein by reference disclose inventions relating to acetylene terminated polyimides or various combinations employing polyimides. The principal disadvantage of the oligomers, polymers and copolymers disclosed in these patents lies in their relatively high melting points which renders them difficult to process and in the high cost of the materials.

The results of similar studies of high temperature polyimides which are not acetylene terminated are disclosed in U.S. Pat. No. 3,897,395, issued to Gaetano Francis D'Alelio for "Chain-Extending Functional Polyimides by Dipole Reactions" in July of 1975. The materials of the "395" D'Alelio Patent are fairly characterized as intractable and very difficult to process.

Applicants are unaware of any polymeric resins which cure through addition reactions without the production of void producing gasses that are easily prepared, exhibit long pot lives and exhibit good stabilities at high temperatures. Accordingly, it is an objective of this invention to provide a new family of prepolymers which can be cured into thermoset resins by addition reactions.

A second purpose of this invention is to provide a family of heat resistant plastics.

A third purpose of this invention is to provide a family of very easily synthesized thermosetting prepolymers.

A fourth purpose is to provide a family of thermosetting prepolymers in which the imine moiety is conjugated with at least one adjacent aromatic ring, since this type of structure enhances thermal stability.

A fifth objective of this invention is to provide diimines or polyimines which contain two or more acetylene terminal groups.

A sixth objective of this invention is to provide curable prepolymers suitable for use in manufacturing laminates, molding compounds, lubricative solid composites, structural composites, etc.

SUMMARY OF THE INVENTION

In seeking to achieve the above-stated objectives while avoiding the disadvantages of the prior art, a new class of acetylene-terminated tetraimines which thermally polymerize into polyimines has been discovered.

The prepolymers of this invention may be synthesized, from readily available diamines, acetylene-substituted mono amines and dicarboxaldehydes, in as little as 15 minutes to form polymerizable materials having the following structure

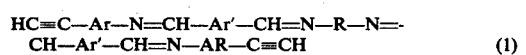

where: R is a moiety whose structure is

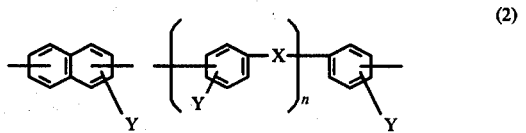

where n may range from 0 to about 4, X may be O, S, $SO_2$, $CH_2$, $CF_2$, $C_3F_6$, $C_2F_4$, —CH=CH—, —CH$_2$—CH$_2$—, or NH or a bond and Y may be —CH$_3$, —C$_2$H$_5$, Cl, CF$_3$, C$_6$H$_5$, etc; Ar may be a moiety whose structure is

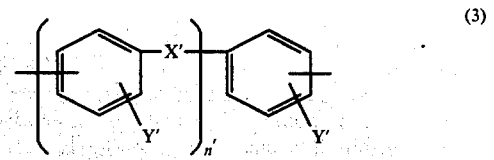

where: n' may range from 0 to 2, X' may be $CH_2$, O, S, $SO_2$, $CF_2$, $C_2F_4$, $C_3F_6$, $C_{10}H_6$, —$C_6H_4$—$C_6H_4$—, or a bond and Y' may be aryl, alkyl, arylalkyl, alkylaryl or halogen substituents; and Ar' is the same as Ar but need not be identical to Ar within the same molecule.

The oligomers or prepolymers of this invention polymerize into low cost thermoset polyimines at temperatures as low as 130° C. The cured polyimine resins exhibit thermal stabilities at temperatures as high as 300° C. for several hundred hours in air.

DETAILED DESCRIPTION OF THE INVENTION

We have discovered that polymerizable acetylene terminated tetraimines can be synthesized by reacting a diamine with two moles of a dicarboxaldehyde to form an aldehyde terminated diimine intermediate product which then reacts with two moles of an acetylene-substituted mono amine.

The synthesis process follows the following reaction scheme:

$$2(OHC-Ar-CHO) + (H_2N-R-NH_2) \rightarrow OHC-Ar-CH=N-R-N=CH-Ar-CHO \quad (4)$$

$$OHC-Ar-CH=N-R-N=CH-Ar-CHO + 2(HC\equiv C-Ar'-NH_2) \rightarrow HC\equiv C-Ar'-N=CH-Ar-CH=N-R-N=CH-Ar-CH=N-Ar'-C\equiv CH \quad (5)$$

wherein Ar and Ar' may be moieties whose formulas are

  (3)

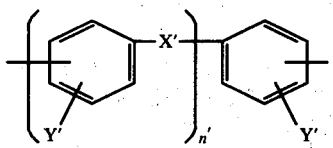

where: n' ranges from 0 to 2; X' may be $CH_2$, O, S, $SO_2$, $CF_2$, $C_2F_4$, $C_3F_6$, $C_{10}H_6$, or $-C_6H_4-C_6H_4-$; and Y' may be aryl, alkyl arylakyl, alkylaryl or halogen substituents (Ar may, but need not, be identical to Ar' within the same molecule), and R is a moiety whose structure is

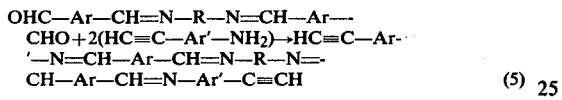  (2)

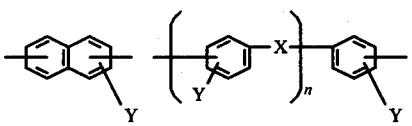

where n ranges from 0 to about 4; X may be O, S, $SO_2$, $CH_2$, $CF_2$, $C_3F_6$, $C_2F_4$, $-CH=CH-$, $-CH_2-CH_2-$, or NH; and or a bond; and Y may be $-CH_3$, $-C_2H_5$, Cl, $CF_3$, or $C_6H_5$.

The preferred dicarboxaldehydes are terephthalaldehyde and isophthalaldehyde because of their availability.

While almost any diamine is suitable, we prefer to utilize bis(aminophenoxy) benzene or 4,4'-diaminodiphenyloxide.

Meta substituted aminoarylacetylenes are preferred over ortho and para substituted aminoarylacetylenes because these compounds typically yield products with lower melting points. Typical preferred compounds falling within this class are 3-aminophenylacetylene, 3(4-amino phenoxy)phenylacetylene, 3(4-amino phenylthio)phenylacetylene, 3(3-amino phenoxy)phenylacetylene and 3(3-amino phenylthio) phenylacetylene. These compounds are described in U.S. Pat. No. 3,928,450, incorporated herein by reference, that was issued to Norman Bilow, Robert H. Boschan and Abraham L. Landis for "Acetylene Substituted Aromatic Primary Amines and the Process of Making Them" on December 23, 1975.

Para and ortho substituted aminoarylacetylenes are well known in the art and need not be described herein.

In practice solvent solutions containing two moles of the dialdehyde and one mole of the diamine are mixed together and allowed to react. The product of this reaction is then mixed with stoichiometric amounts of the aminoarylacetylene and stirred until the prepolymer forming reaction is completed. The solvent is subsequently removed and the resulting product is dried in a vacuum oven and allowed to cool until ready for use.

Oligomers or prepolymers prepared in accordance with this invention exhibit substantially different properties from that exhibited by the prior art acetylenic imide prepolymers. These differences are shown in the following table:

| Property | The Closest Prior Art Analogue Acetylenic imide | Example #4 The Invention Acetylenic imine |
|---|---|---|
| Melting point | ~195–200° C. | <40° C. |
| Cure temp. | >230° C. | 150° C. |
| Synthesis time | 8–12 hrs. | 15 min. to 2 hrs. |

It can be readily seen, from an examination of the data in the table above, that the prepolymers of this invention are far less expensive and considerably easier to prepare and utilize than the prior art acetylenic polyimide oligomers.

We refer to subject these prepolymers to an initial cure temperature of from 150° to 210° C. with subsequent post cures at temperatures up to 300° C. to effectuate complete cures of the uncatalyzed homopolymers. However, cures may be obtained via the use of catalyst, such as the organo-metallic complexes, at temperatures as low as room temperature.

Other modes of polymenization such as copper catalyzed oxidative coupling may be utilized to form fully cured polytetraimines from these oligomers.

Specific examples showing the synthesis of our prepolymers are shown below.

EXAMPLE 1

One mole of 1,3-bis(3-aminophenoxy)benzene is dissolved in a 3:1 volume mixture of methylenechloride and ethanol. Two moles of isophthalaldehyde are dissolved in a 3:1 by volume mixture of $CH_2Cl_2$ and $C_2H_5OH$. The two solutions are mixed and stirred together for about ½–1 hour. Two moles of 3-aminophenylacetylene is then added to the reaction mixture and the blend is stirred for about 1 hour. Solvent is then removed by distillation under reduced pressure, keeping the pot temperature below 80° C. The prepolymer is then removed from the flask, cooled, pulverized, and dried in a vacuum oven.

EXAMPLE 2

This example is identical to example 1 except that terephthalaldehyde is used instead of isophthalaldehyde.

EXAMPLE 3

Identical to example 1 except that 4,4'-diaminodiphenyl oxide is used instead of 1,3-bis(3-aminophenoxy)-benzene.

EXAMPLE 4

1,3-bis(3-aminophenoxy) benzene (14.6 g, 0.05 mole) is dissolved in a mixture of ethanol (20 ml.) and chloroform (60 ml.). A solution of isophthalaldehyde (13.4 g, 0.1 mole) in a mixture of chloroform (60 ml.) and ethanol (20 ml.) was then added over a ½ hour period with vigorous stirring. After 2 hours of stirring, the solution was still clear and homogeneous. 3-aminophenylacetylene (11.7 g, 0.1 mole) was then added and stirring continued for 2½ hours. Solvent was removed by vacuum distillation and the prepolymer was removed from the flask, cooled, pulverized and dried further in a vacuum oven with low heat.

A sample of the product of example 1 was found to be an amorphous solid which softened at 40°–45° C. When heated to 150° C. in the absence of air for about 16 hours it yielded a very tough resin with a $T_g$ (glass transition temperature or heat distortion temp.) of 230°–260° C. When analyzed by thermogravimetric analysis, it showed a degradation temperature of over 350° C. The product also was soluble in halogenated low boiling solvents prior to cure. It was thus a good lacquer former. It proved to be an excellent laminating resin.

Having disclosed our invention and provided teachings to enable others to make and use the same, the scope of our claims may now be understood as follows:

What is claimed is:

1. A homopolymerizable acetylene substituted tetraimine oligomer having the structure:

HC≡C—Ar—N=CH—Ar'—CH=N—R—N=CH—Ar'—CH=N—Ar—C≡CH where:

R is a moiety whose structure is selected from the group consisting of

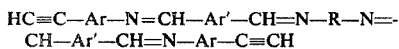 and

-continued

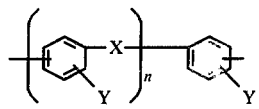

wherein; n may range from 0 to about 4, X may be O, S, SO$_2$, CH$_2$, CF$_2$, C$_3$F$_6$, C$_2$F$_4$, —CH=CH—, —CH$_2$—CH$_2$— a bond or NH and Y may be —CH$_3$, —C$_2$H$_5$, —C$_6$H$_5$, —CF$_3$ or Cl; Ar is a moiety selected from the group consisting of

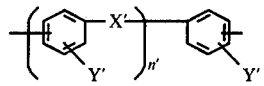

wherein n' may range from 0 to 2, X' may be O, S, SO$_2$, CF$_2$, C$_2$F$_4$, C$_3$F$_6$, C$_{10}$H$_6$ or —C$_6$H$_4$—C$_6$H$_4$— and Y' may be aryl, alkyl, arylakyl, alkylaryl or halogen substituted analogues; and where Ar' may be the same as, but need not be identical to, Ar within the same molecule.

2. The tetraimine oligomer of claim 1 wherein R is phenylene.
3. The oligomer of claim 2 wherein Ar is phenylene.
4. The oligomer of claim 1 wherein R is —C$_6$H$_4$—O—C$_6$H$_4$—O—C$_6$H$_4$—.
5. The oligomer of claim 1 wherein Ar is phenylene.
6. The oligomer of claim 1 wherein Ar' is phenylene.
7. The oligomer of claim 1 wherein R is phenylene oxyphenylene.
8. The oligomer of claim 3 wherein said HC≡C-terminal groups are joined to said Ar groups at a meta position with respect to said imine groups.
9. The tetraimine oligomer of claim 8 wherein R is phenylene.
10. The oligomer of claim 8 wherein R is —C$_6$H$_4$—O—C$_6$H$_4$—O—C$_6$H$_4$—.
11. The oligomer of claim 8 wherein Ar is phenylene.
12. The oligomer of claim 8 wherein Ar' is phenylene.
13. The oligomer of claim 8 wherein R is phenylene oxyphenylene.
14. A process for preparing a homopolymerizable acetylene terminated tetraimine oligomer comprising the steps of first reacting aryldicarboxaldehydes with an aryldiamine to form a dicarboxaldehyde terminated diamine and subsequently reacting said dicarboxaldehyde terminated diamine with aminoarylacetylenes thereby forming said acetylene terminated tetraimine.
15. The process of claim 14 wherein stiochiometric amounts of said dicarboxaldehyde are reacted with one mole of said diamine.

* * * * *